(12) United States Patent
Bonney et al.

(10) Patent No.: US 8,282,077 B1
(45) Date of Patent: Oct. 9, 2012

(54) POLE PULLER SYSTEM

(76) Inventors: Eugene H. Bonney, Belfast, ME (US); John Bonney, Belfast, ME (US)

( * ) Notice: Subject to any disclaimer, the term of this patent is extended or adjusted under 35 U.S.C. 154(b) by 980 days.

(21) Appl. No.: 12/218,886

(22) Filed: Jul. 18, 2008

(51) Int. Cl.
| E21B 19/00 | (2006.01) |
| B66F 3/00 | (2006.01) |
| B66F 11/00 | (2006.01) |
| A01B 1/16 | (2006.01) |
| B21F 9/00 | (2006.01) |
| A01G 23/02 | (2006.01) |

(52) U.S. Cl. ......... 254/30; 254/132; 254/29 R; 254/228; 414/23

(58) Field of Classification Search .................... 254/30, 254/132, 29 R, 228, 108, 113; 414/23
See application file for complete search history.

(56) References Cited

U.S. PATENT DOCUMENTS

| 3,946,988 | A | | 3/1976 | Kehren | |
| 4,226,402 | A | | 10/1980 | Muth | |
| 4,280,683 | A | | 7/1981 | Knierim | |
| 4,721,335 | A | | 1/1988 | Krenek, Jr. | |
| 4,738,433 | A | * | 4/1988 | Hoff ................................ | 254/30 |
| 4,822,006 | A | | 4/1989 | McIntire | |
| 4,893,783 | A | | 1/1990 | Diener et al. | |
| 5,211,374 | A | | 5/1993 | Head et al. | |
| 5,499,795 | A | | 3/1996 | Mathews | |
| 5,513,555 | A | * | 5/1996 | Plank et al. ...................... | 92/19 |
| 5,558,169 | A | * | 9/1996 | Madgwick et al. ........... | 173/185 |
| 5,586,584 | A | | 12/1996 | Hlademann | |
| 5,662,176 | A | * | 9/1997 | Madgwick et al. ........... | 173/185 |
| 5,681,030 | A | * | 10/1997 | Nall ................................. | 254/30 |
| 5,692,731 | A | * | 12/1997 | Beauchamp .................... | 254/124 |
| 5,713,559 | A | * | 2/1998 | McClarin et al. ............. | 254/124 |
| 5,794,918 | A | * | 8/1998 | Price ................................ | 254/30 |
| 5,833,215 | A | * | 11/1998 | Vandenburg .................... | 254/30 |
| 5,911,408 | A | * | 6/1999 | Berends et al. .............. | 254/2 B |
| 5,934,649 | A | * | 8/1999 | Drane ............................. | 254/30 |
| 6,302,377 | B1 | * | 10/2001 | Pimentel ........................ | 254/30 |
| 6,352,242 | B1 | * | 3/2002 | Medearis ........................ | 254/30 |
| 6,382,594 | B1 | * | 5/2002 | Ransom ......................... | 254/30 |
| 6,398,188 | B1 | * | 6/2002 | Salman .......................... | 254/30 |
| 6,488,267 | B1 | | 12/2002 | Goldberg et al. | |
| 6,598,856 | B1 | * | 7/2003 | Puff et al. ....................... | 254/18 |
| 6,641,347 | B2 | * | 11/2003 | Ewington ...................... | 414/23 |
| 6,669,172 | B1 | * | 12/2003 | Bearden ......................... | 254/30 |
| 6,857,619 | B1 | * | 2/2005 | Jangula .......................... | 254/30 |
| 6,863,262 | B2 | | 3/2005 | Brittain et al. | |
| 6,866,248 | B1 | * | 3/2005 | Sears .............................. | 254/30 |
| 6,976,670 | B1 | | 12/2005 | Woolley et al. | |
| 6,978,983 | B1 | | 12/2005 | Sclease et al. | |
| 7,090,199 | B2 | | 8/2006 | Brittain et al. | |
| 7,103,951 | B2 | * | 9/2006 | Uzun ............................. | 29/227 |
| 7,125,000 | B1 | * | 10/2006 | Saavedra et al. .............. | 254/30 |
| 7,137,616 | B2 | * | 11/2006 | Kysely .......................... | 254/30 |
| 7,431,266 | B1 | * | 10/2008 | Evans ............................ | 254/30 |
| 7,926,786 | B2 | * | 4/2011 | Slagle ............................ | 254/30 |
| 7,963,051 | B2 | * | 6/2011 | Ford .............................. | 37/195 |
| 2006/0231810 | A1 | * | 10/2006 | Rishton .......................... | 254/30 |
| 2007/0018144 | A1 | * | 1/2007 | Saavedra et al. ............... | 254/30 |
| 2010/0102285 | A1 | * | 4/2010 | Richard et al. ................. | 254/30 |

* cited by examiner

*Primary Examiner* — Lee D Wilson
*Assistant Examiner* — Alvin Grant
(74) *Attorney, Agent, or Firm* — Edward P Detkiewicz

(57) ABSTRACT

A pole puller system comprising a base plate, a slide tube, and a slide. The system further comprises a hydraulic cylinder, a hydraulic fluid pump, and a pair of hydraulic hoses. There is also provided a means for coupling a pole to be pulled to the slide.

14 Claims, 10 Drawing Sheets

POLE PULLER SYSTEM

NEW RULE 1.78(F)(1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to a pole puller system and more particularly pertains to a device for removing out-of-service utility poles 2. Description of the Prior Art The use of pole and post removing devices is known in the prior art. More specifically, pole and post removing devices previously devised and utilized for the purpose of removing posts and poles at the end of usefulness are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art does not describe pole puller system that allows a device for removing out-of-service utility poles as herein described.

In this respect, the pole puller system according to the present invention, substantially departs from the conventional concepts and designs of the prior art, and in doing so provides an apparatus primarily developed for the purpose of a device for removing out-of-service utility poles Therefore, it can be appreciated that there exists a continuing need for a new and improved pole puller system which can be used for a device for removing out-of-service utility poles. In this regard, the present invention substantially fulfills this need.

SUMMARY OF THE INVENTION

In view of the foregoing disadvantages inherent in the known types of pole and post removing devices now present in the prior art, the present invention provides an improved pole puller system. As such, the general purpose of the present invention, which will be described subsequently in greater detail, is to provide a new and improved pole puller system and method which has all the advantages of the prior art and none of the disadvantages.

To attain this, the present invention essentially comprises a pole puller system comprising several components, in combination.

First provided is a base plate. The base plate is fabricated of a rigid material, preferably steel though other rigid materials, such as composites may be used. The base plate has a generally rectilinear configuration. The base plate has a lower, ground contact surface and an upper lift contact surface, with a thickness there between. The base plate has an edge located between the upper surface and lower surface. The upper surface of the base plate has a slide tube mounting portion and a ram mounting portion. The ram mounting portion comprises a tab for coupling a ram thereto. The tab has a ram mounting pin hole there through, with an associated ram mounting pin for coupling the ram to the base plate tab.

Next provided is a slide tube. The slide tube has a generally hollow rectangular cross-sectional tubular configuration. The slide tube has an outer surface, an inner surface, and a tube wall thickness there between. The slide tube has a passageway therein.

The slide tube has a first external diameter across the cross-sectional tubular passageway, with a center point running the length of the slide tube passageway. The slide tube has a lower end, with lower end portion, and an upper end with an upper end portion. There is a length there between. The slide tube has an overall length, from the upper end of the tube to the lower end of the tube, of a first length. The lower end of the slide tube has a plurality of mounting fins coupled thereto. The mounting fins couple the slide tube with the base plate by a securing means. A securing means may be any one or combination of weldment, bolt, screw, clamp, wire or other such fixing device. The slide tube is oriented generally perpendicular to the upper surface of the base plate. The upper end of the slide tube has a lifting tab coupled thereto. The lifting tab has a lifting aperture there through. The slide tube has a central axis located along the center point of the passageway through the slide tube.

Next provided is a slide. The slide has a generally hollow rectangular cross-sectional tubular configuration. The slide has an outer surface and an inner surface, and a slide wall thickness there between with a passageway therein. The slide passageway has a second internal diameter within the cross-sectional tubular passageway, with the passageway having a center point. The second internal diameter of the slide is greater than the first external diameter of the slide tube so as to allow the inner surface of the slide to be slidably moved along the outer surface of the slide tube, in a telescoping-like maneuver. The slide has a lower end with a lower end portion, and an upper end with an upper end portion. There is an intermediate portion, having a length, there between.

The slide has an axis running with the passageway center point from the upper end of the slide to lower end of the slide. The axis is generally parallel with the passageway through the slide. The slide has an overall length, from the upper end of the slide to the lower end of the slide, of a second length. The second length of the slide is less than the first length of the slide tube.

The intermediate portion of the slide has a pair of pole chain mounting portions, with a pole cradle having a length, coupled thereto. The pole cradle has a generally rectilinear configuration with opposing ends. The pole cradle length is orientated in a generally perpendicular position relative to the slide axis. The chain mounting portion of the cradle is located at each of the opposing ends of the pole cradle. The pole cradle and pole chain mounting portions are oriented generally perpendicular to the slide axis. The pole cradle has a generally C-shaped configuration with parallel side tabs. Each of the side tabs have a rounded and slotted chair mounting aperture there through, resembling a keyhole.

The slide has a reinforcement strip coupling the chain mounting portion and the slide. The reinforcement strip is coupled to the slide by a securing means. A securing means may be a weldment, one or more bolts, screws, threads, clamps, clips, pins, wires, and any such commonly found means of securing items in relation to one another. The slide and slide tube are oriented generally in-line with each other.

The slide has a hydraulic ram mounting portion comprising a mounting tab with a mounting aperture there through. There is an associated mounting pin for coupling a hydraulic ram to the slide. The slide hydraulic mounting portion is coupled to the upper portion of the slide.

The slide has a plurality of grease fitting there through to allow the placement of grease between the tube outer surface and the slide inner surface, facilitating movement of the slide and tube, relative to each other. The grease fittings are recessed in the slide to lessen the chance or damage to the grease fitting. In other embodiments, the grease fittings may have an associated cap, to protect the grease fittings from damage caused by impact of objects with the slide.

Next provided is a hydraulic cylinder. The hydraulic cylinder has an outer case, with the outer case having an inner surface and an outer surface with a wall thickness there between. The outer case has a cylinder recess contained therein. The hydraulic cylinder has an first hydraulic hose connection and a second hydraulic hose connection. Each hydraulic hose connection provides a passageway into the cylinder recess within inner surface of the case, for the passage of a hydraulic fluid there into. The ram is located within the recess of the cylinder, with the ram having at least one hydraulic seal coupling the ram and the inner surface of the outer case.

The hydraulic cylinder has an end cap with a ram aperture there through. The end cap is coupled to the cylinder casing, with the end cap having an associated hydraulic fluid seal contained therein. The hydraulic cylinder outer case is coupled to the base plate at the location of the base plate mounting tab. The hydraulic ram is coupled to the slide tab so as to effectuate movement of the slide relative to the base as the ram moves within the hydraulic cylinder case.

Next provided is a hydraulic fluid pump. The pump has an associated hydraulic fluid reservoir. The hydraulic pump has at least one actuating valve, for directing hydraulic fluid from the hydraulic pump.

Next provided is a pair of hydraulic hoses. The hoses operatively and fluidly couple the hydraulic pump and the first, and second. hydraulic hose connections of the hydraulic cylinder to the hydraulic fluid pump. The hoses are configured with an internal passageway therein so as to allow the passage of hydraulic fluid from the hydraulic pump to the hydraulic cylinder.

Next provided is a boom truck. The boom truck is one which is commonly found in the market place. The boom truck has a boom. The boom is configured to lift the pole puller, and position the pole puller near a pole to be pulled.

Lastly provided is a chain. The chain is coupled to the chain mounting portion of the slide. The chain is used to couple the pole puller to the pole to be pulled.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pole puller system which has all of the advantages of the prior art describing pole and post removing devices, and none of the disadvantages.

It is another object of the present invention to provide a new and improved pole puller system which may be easily and efficiently manufactured and marketed.

It is further object of the present invention to provide a new and improved pole puller system which is of durable and reliable constructions.

An even further object of the present invention is to provide a new and improved pole puller system which is susceptible of a low cost of manufacture with regard to both materials and labor, and which accordingly is then susceptible of low prices of sale to the consuming public, thereby making such pole puller system economically available to the buying public.

Even still another object of the present invention is to provide a pole puller system for removing out-of-service utility poles in a safe and efficient manner.

Lastly, it is an object of the present invention to provide a new and improved pole puller system that comprising a base plate, a slide tube, and a slide. The system further comprises a hydraulic cylinder, a hydraulic fluid pump, and a pair of hydraulic hoses. There is also provided a means for coupling a pole to be pulled to the slide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
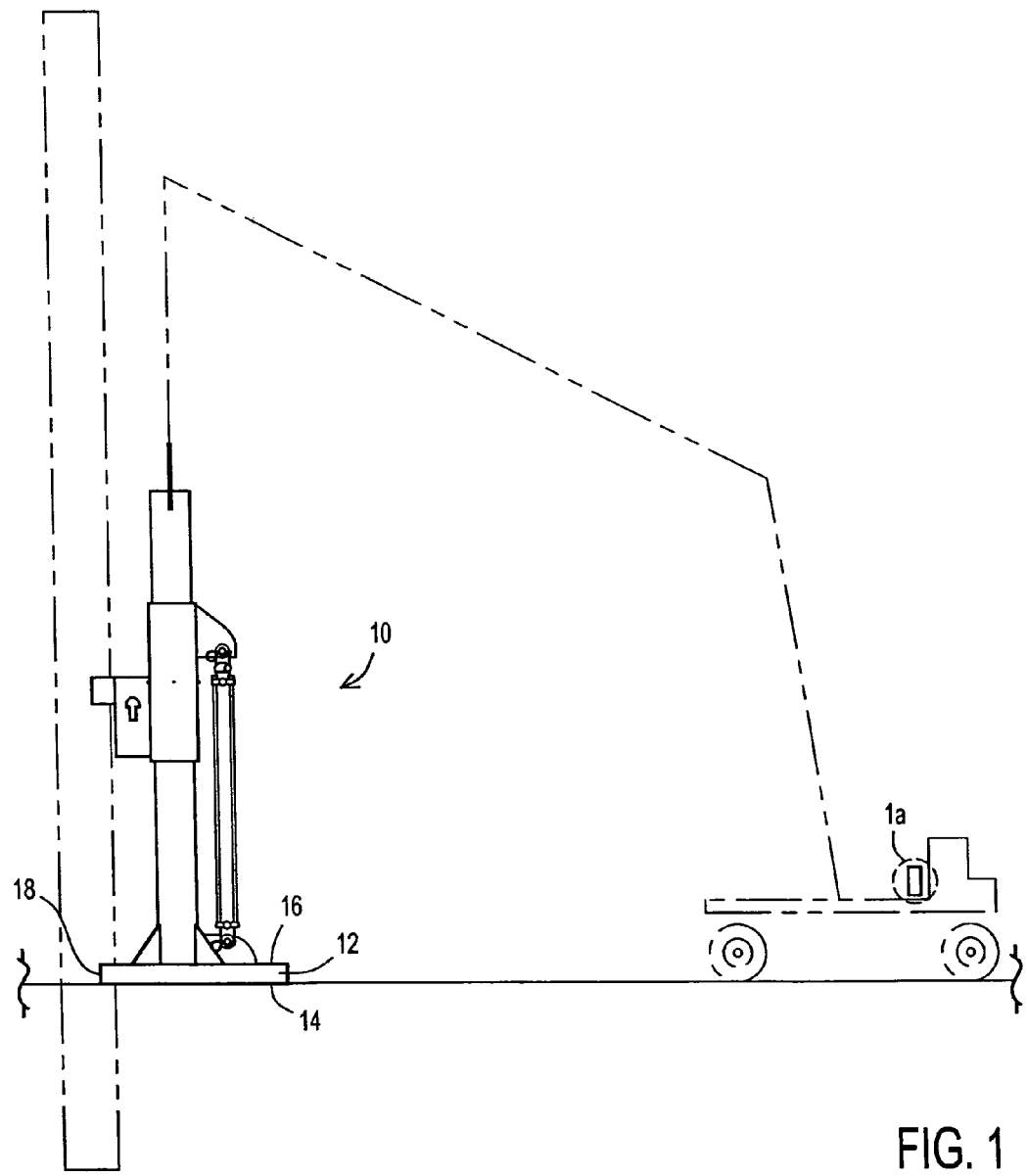
FIG. 1 is a side elevation, showing the pole puller, with the boom truck, boom, and lifting cable shown in broken line.
Figure 1A:
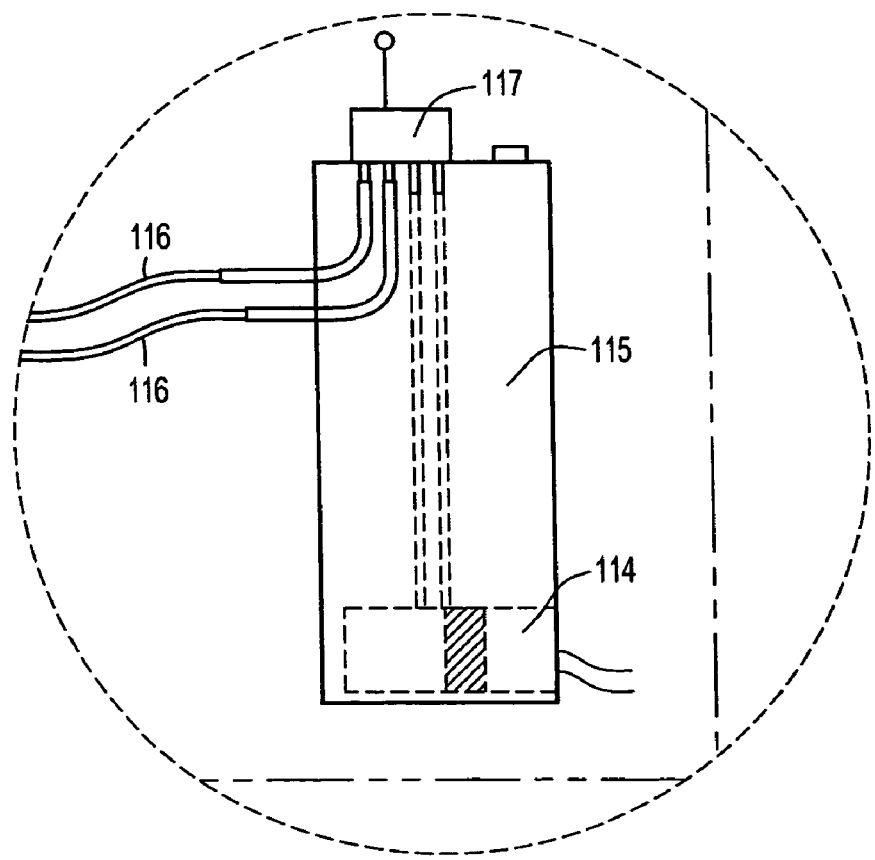

With reference now to the drawings, and in particular to FIG. 1 thereof, the preferred embodiment of the new and improved pole puller system embodying the principles and concepts of the present invention and generally designated by the reference numeral 10 will be described.

The present invention, the pole puller system 10 is comprised of a plurality of components. Such components in their broadest context include a base, a slide tub, a slide and a pole cradle. Such components are individually configured and correlated with respect to each other so as to attain the desired objective.

A pole puller system comprising several components, in combination.

First provided is a base plate 12. The base plate is fabricated of a rigid material, preferably steel though other rigid materials, such as composites may be used. The base plate has a generally rectilinear configuration with one side of the plate having a concavely curved surface 14 to accommodate easy placement with a pole to be pulled. The base plate has a lower, ground contact surface 16 and an upper lift contact surface 18, with a thickness there between. The base plate has an edge 20 located between the upper surface and lower surface. The upper surface of the base plate has a slide tube mounting portion 22 and a ram mounting portion 24. The ram mounting portion comprises a tab 26 for coupling a ram thereto. The tab has a ram mounting pin hole 28 there through, with an associated ram mounting pin 30 for coupling the ram to the base plate tab.

In another embodiment the base may also have a plurality of stabilizer mounting tabs 31. The tabs are each configured to have a flat edge 33 for fixing the tab to the base, and a rounded edge 35. The rounded edge has a plurality of locking pin holes 37 there through. There is a centrally located pivot pin aperture 39 through each of the stabilizer mounting tabs. The locking pin holes have an associated locking pin 41, which is a solid or hollow cylindrical pin with a enlarged end and a pin end having a uniform cross sectional diameter, as is well known in the art. The pivot pin 43 is also well known in the art, and may be a pin or a bolt, or any other rounded, solid or hollow tubular structure so as to allow the easy pivoting of the stabilizer arm about the pin circumference. The pivot pin is well known in the art. In this embodiment, there is one stabilizer mounting tab on each edge of the base plate.

In another embodiment there may be pairs of tabs 45, with the stabilizer arm being located between the tabs. In this configuration there are also like-configured locking pin holes and like-configured pivot pin holes in the pairs of stabilizer tabs.

Each stabilizer mounting tab has an associated stabilizer arm 47. The arm has a generally rectilinear configuration with a pivoting end 49 and a pad end 51, with a length there between. The pivoting pin end may be planar, and in other configurations, may be C shaped 53 so as to reside on both sides of the stabilizer mounting tab.

In the preferred embodiment there are two parallelly located tabs associated with each arm. The tabs of the pairs are located on opposing sides of the arm. The pivot pin is located in the pivot pin hole of the tab and the pivot pin hole of the arm. The arm also has locking holes, through which a locking pin is located. The locking pin passes through one locking pin hole in one tab, then through the arm locking pin hole, and then through the opposing tab locking pin hole, thereby locking the stabilizer arm in a position. There may be multiple locking pin holes in each tab, with the locking pin holes being located in a generally radius-like array.

Next provided is a slide tube 40. The slide tube has a generally hollow rectangular cross-sectional tubular configuration. The slide tube has an outer surface, an inner surface, and a tube wall thickness there between. The slide tube has a passageway 44 therein.

The slide tube has a first external diameter across the cross-sectional tubular passageway, with a center point 46 running the length of the slide tube passageway. The slide tube has a lower end 48, with lower end portion 50, and an upper end 52 with an upper end portion 54. There is a length there between. The slide tube has an overall length, from the upper end of the tube to the lower end of the tube, of a first length. The lower end of the slide tube has a plurality of mounting fins 60 coupled thereto. The mounting fins couple the slide tube with the base plate by a securing means. A securing means may be any one or combination of weldment, bolt, screw, clamp, wire or other such fixing device. The slide tube is oriented generally perpendicular to the upper surface of the base plate. The upper end of the slide tube has a lifting tab 62 coupled thereto. The lifting tab has a lifting aperture 64 there through. The slide tube has a central axis located along the center point of the passageway through the slide tube.

Next provided is a slide 70. The slide has a generally hollow rectangular cross-sectional tubular configuration. The slide has an outer surface and an inner surface, and a slide wall thickness there between with a passageway 74 therein. The slide passageway has a second internal diameter within the cross-sectional tubular passageway, with the passageway having a center point which, when the system is assembled, the center point of the slide coincides and is located at the same approximate location as the center point of the slide tube. The second internal diameter of the slide is greater than the first external diameter of the slide tube so as to allow the inner surface of the slide to be slidably moved along the outer surface of the slide tube, in a telescoping-like maneuver. The slide has a lower end 76 with a lower end portion 78, and an upper end 80 with an upper end portion 82. There is an intermediate portion 84, having a length, there between.

The slide has an axis (also located at 46) running with the passageway center point from the upper end of the slide to lower end of the slide. The axis is generally parallel with the passageway through the slide. The slide has an overall length, from the upper end of the slide to the lower end of the slide, of a second length. The second length of the slide is less than the first length of the slide tube.

The intermediate portion of the slide has a pole cradle 86 and cradle brace 88 coupled thereto. The pole cradle has a length. The pole cradle has a generally rectilinear configuration with opposing ends. The pole cradle length is orientated in a generally perpendicular position relative to the slide axis.

In the preferred embodiment there is a chain mounting hole 90, in the form of a key hole, located through the cradle brace.

In other embodiment the chain mounting portion of the cradle is located at each of the opposing ends of the pole cradle. As with the preferred embodiment, in another embodiment the pole cradle has an associated brace which couples the pole cradle to the slide. The pole cradle is oriented generally perpendicular to the slide axis.

In an another embodiment, the pole cradle has a generally C-shaped configuration with parallel side tabs, with the side tabs having a chain hole 91 there through.

In the preferred embodiment the pole cradle has a generally C-shaped configuration with parallel side tabs. The pole cradle brace has a chain hole there through, resembling a keyhole.

The pole cradle brace is coupled to the slide by a securing means. A securing means may be a weldment, one or more bolts, screws, threads, clamps, clips, pins, wires, and any such commonly found means of securing items in relation to one another. The slide and slide tube are oriented generally in-line with each other.

The slide has a hydraulic ram mounting portion 92 comprising a mounting tab with a mounting aperture 94 there through. There is an associated mounting pin 96 for coupling a hydraulic ram to the slide. The slide hydraulic mounting portion is coupled to the upper portion of the slide.

The slide has a plurality of grease fittings 98 there through to allow the placement of grease between the tube outer surface and the slide inner surface, facilitating movement of the slide and tube, relative to each other. The grease fittings are recessed in the slide to lessen the chance or damage to the grease fitting. In other embodiments, the grease fittings may have an associated cap (not shown but well known in the art), to protect the grease fittings from damage caused by impact of objects with the slide.

Next provided is a hydraulic cylinder 100. The hydraulic cylinder has an outer case 102, with the outer case having an inner surface and an outer surface with a wall thickness there between. The outer case has a cylinder recess 104 contained therein. The hydraulic cylinder ha an first hydraulic hose 106 connection and a second hydraulic hose connection 108. Each hydraulic hose connection provides a passageway into the cylinder recess within inner surface of the case, for the passage of a hydraulic fluid there into. A ram 110 is located within the recess of the cylinder, with the ram having at least one hydraulic seal 111 coupling the ram and the inner surface of the outer case. It should be noted that the seal is a two way seal, which allows the ram to be extended or retracted, depending on the valve used to direct hydraulic fluid to the hydraulic cylinder. Such a two way seal is well known in the art, and need no further description.

The hydraulic cylinder has an end cap 112 with a ram aperture there through. The end cap is coupled to the cylinder casing, with the end cap having an associated hydraulic fluid seal (not shown, but known in the art) contained therein. The hydraulic cylinder outer case is coupled to the base plate at the location of the base plate mounting tab. The hydraulic ram is coupled to the slide tab so as to effectuate movement of the slide relative to the base as the ram moves within the hydraulic cylinder case.

Next provided is a hydraulic fluid pump 114. The pump has an associated hydraulic fluid reservoir 115. The hydraulic pump has at least one actuating valve 117, for directing hydraulic fluid from the hydraulic pump.

Next provided is a pair of hydraulic hoses 116. The hoses operatively and fluidly couple the hydraulic pump and the first, and second. hydraulic hose connections of the hydraulic cylinder to the hydraulic fluid pump. The hoses are configured with an internal passageway therein so as to allow the passage of hydraulic fluid from the hydraulic pump to the hydraulic cylinder.

Next provided is a boom truck 120. The boom truck is one which is commonly found in the market place. The boom truck has a boom 122. The boom is configured to lift the pole puller, and position the pole puller near a pole to be pulled.

Lastly provided is a chain 130. The chain is coupled to the chain mounting portion of the slide. The chain is used to couple the pole puller to the pole to be pulled.

In other embodiments other means for coupling the pole puller to a pole may be used. Such means include cables, pins, clamps, clips, wire, rope, snaps, fixtures, and bolts.

In operation, the pole puller allows an operator to lift the pole puller from a truck or trailer. The boom cable 140 or chain is attached to the lifting aperture located at the upper end of the slide tube, and the boom lifts and places the pole puller next to a pole that is to be pulled from the ground, as shown in FIG. 1.

While the pole puller is somewhat suspended from the boom cable, the user places a chain around the pole, and then hooks the chain to the chain aperture of the pole cradle brace. The hydraulic lines are then hooked up to the cylinder. It is preferable that the hydraulic lines are removable so that movement and storage of the pole puller is unencumbered by the presence of hydraulic lines.

Once the hydraulic lines are attached, the system is pressurized. The pressurization causes the ram to move, pushing the slide upwards on the slide tube. This, in turn, causes the chain to tighten around the pole. As consequence the extension of the ram forces the base downward to a full ground contact position, if the base was not in full contact with the ground from the outset of placement. In heavy brush, or frost and snow conditions, it is necessary to force the base downward, by extending the hydraulic ram and pulling on the pole.

Figure 2:
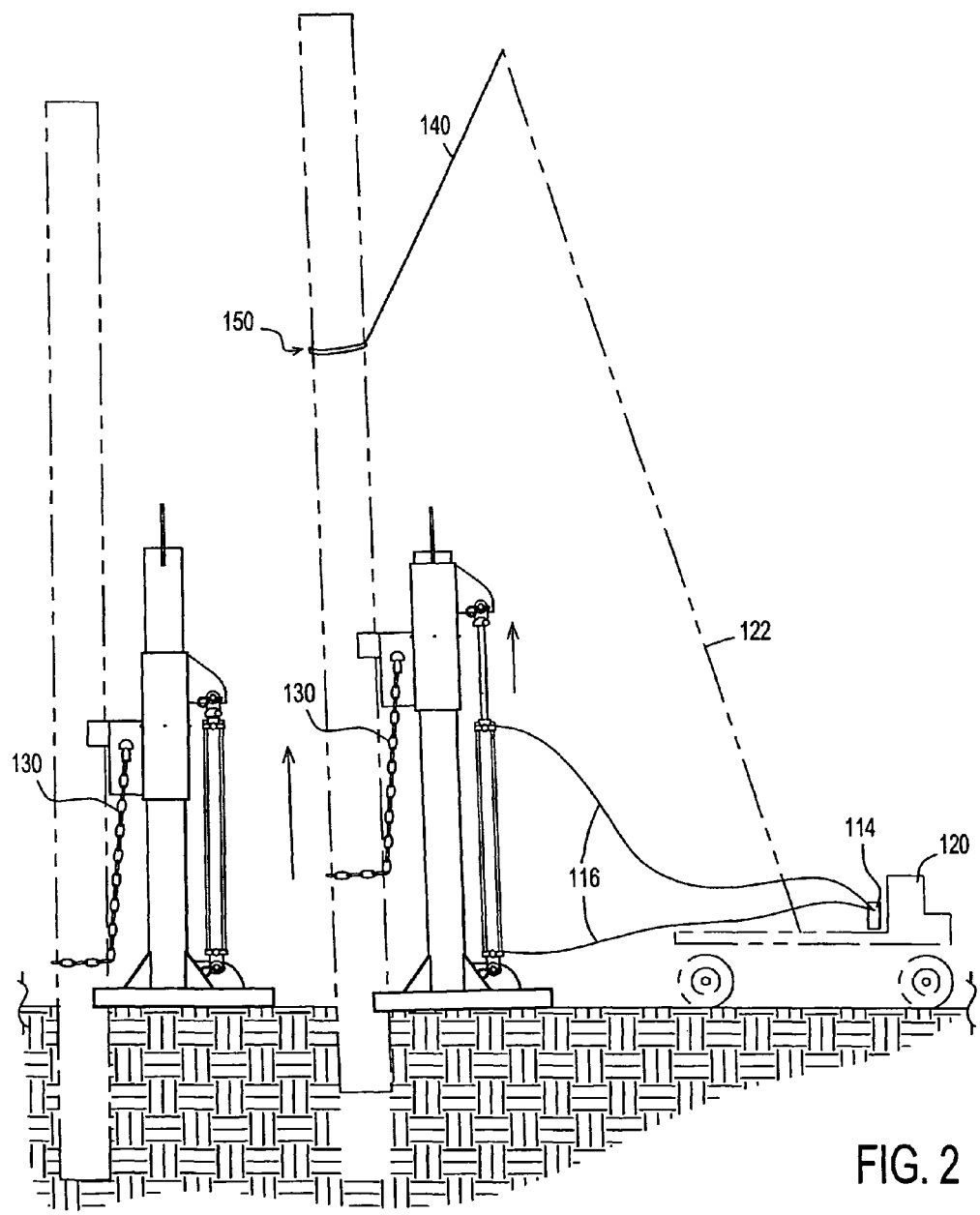
FIG. 2 is a sequential side elevation of the process of pulling a pole from the ground.
Figure 3:
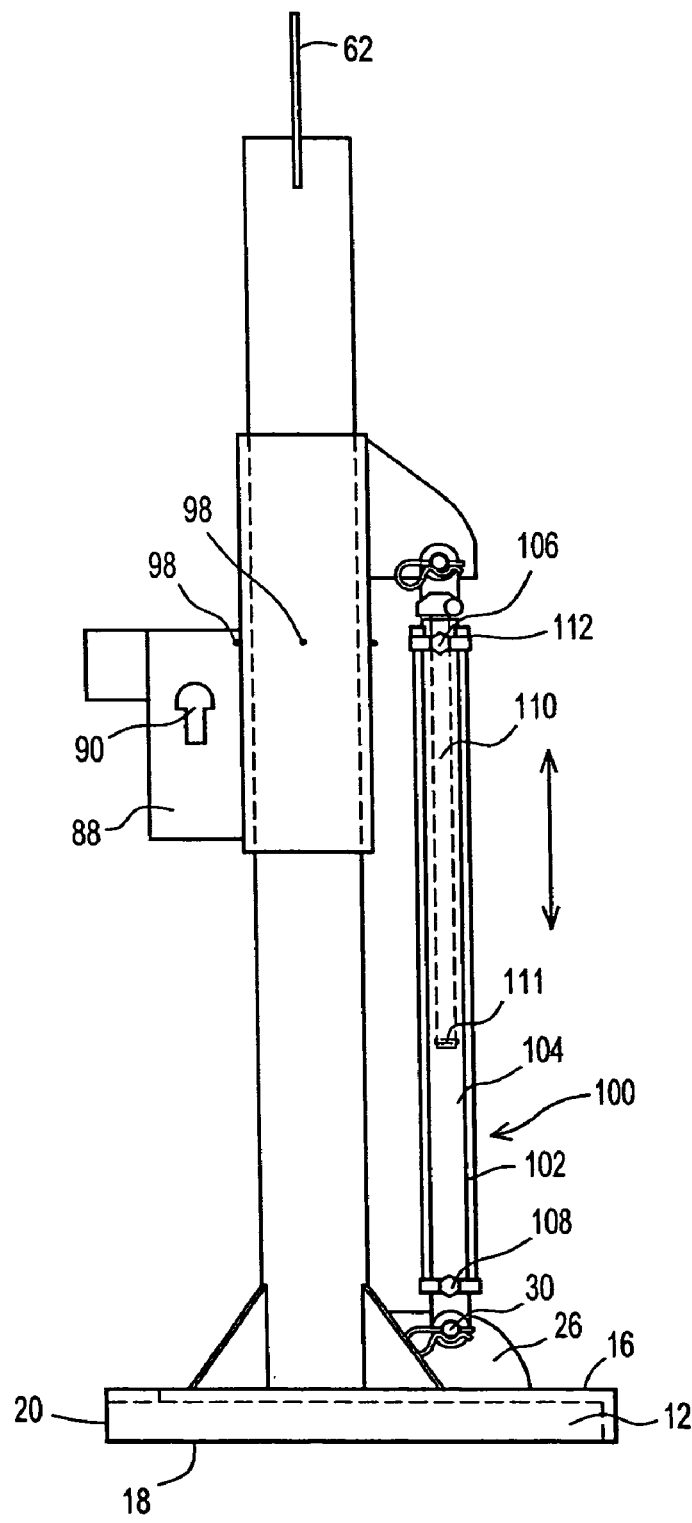
FIG. 3 is a side elevational drawing of the pole puller.
Figure 4:
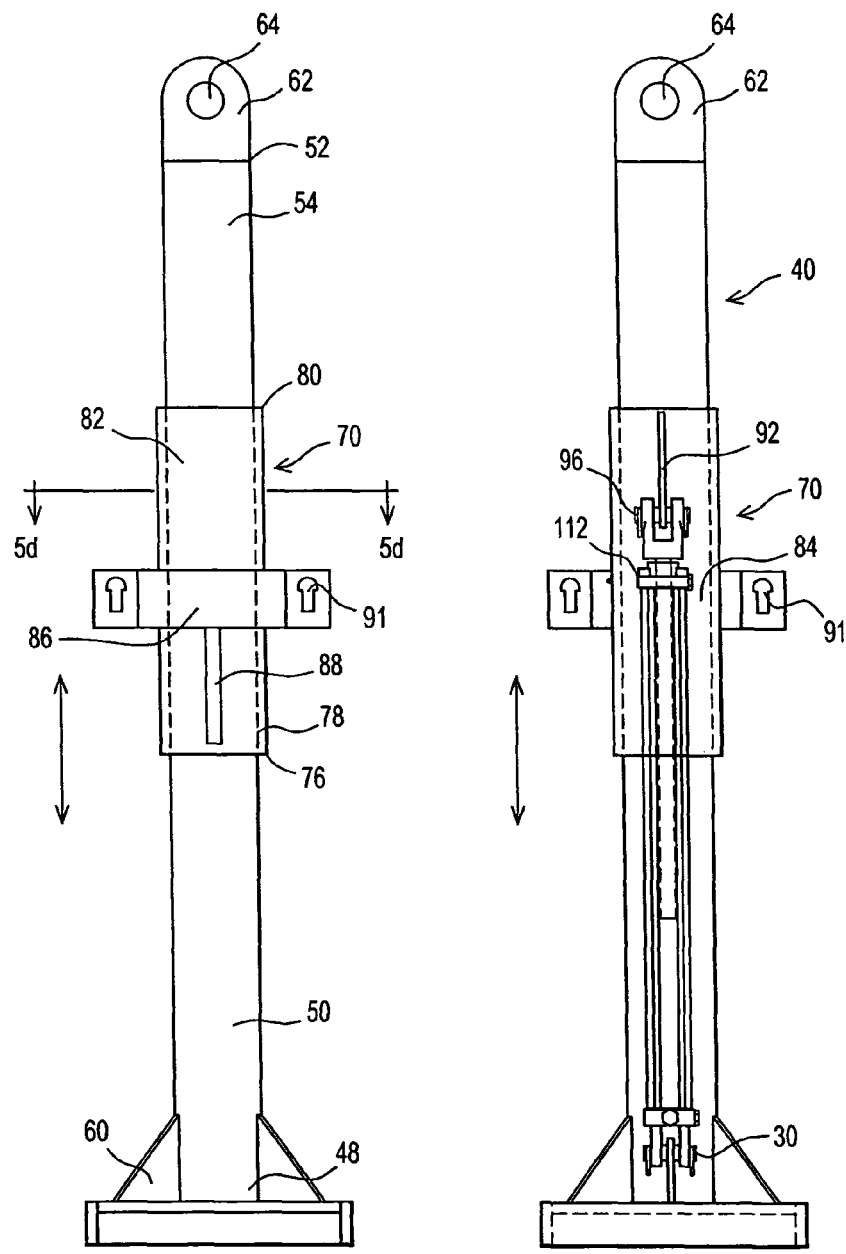
FIG. 4 is a front and rear elevational view of the pole puller.
Figure 5D:
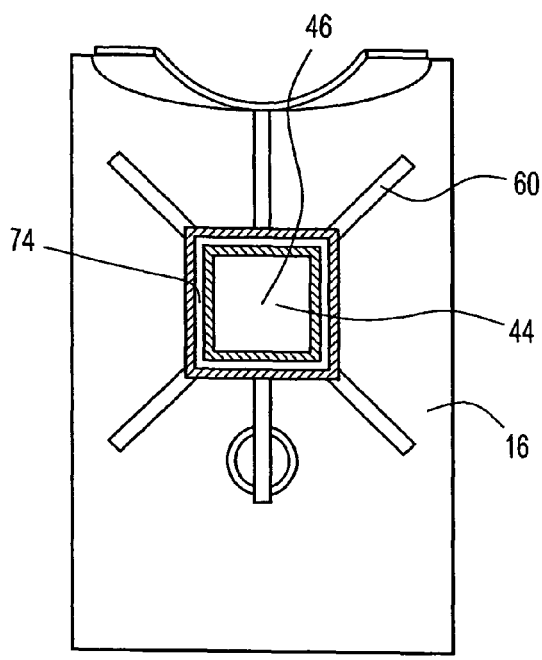
FIG. 5d is a view taken along line 5d of FIG. 4, showing the slide tube and slide in functional relationship. Note that the cradle curvature and base curvature are generally aligned, so as to confirm to the pole to be pulled, and to keep the hydraulic cylinder in alignment with the long axis of the pole being pulled.
Figure 5E:
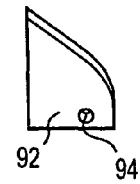
FIG. 5e is a side perspective, partial overview of the tab for coupling the hydraulic cylinder to the slide of the pole puller.
Figure 5C:
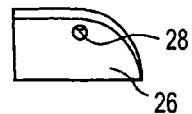
FIG. 5c is a side perspective, partial overview of the tab for coupling the hydraulic cylinder to the base of the pole puller.
Figure 5B:
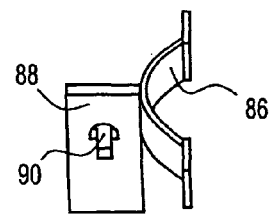
FIG. 5b is a side perspective, partial overview of the pole cradle showing the pole cradle brace.
Figure 5A:
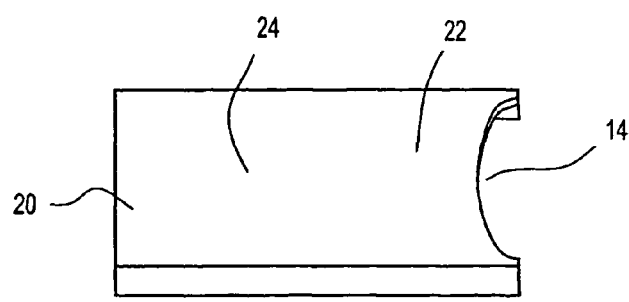
FIG. 5a is a top perspective of the pole puller base. Note the curved pole receiving area.
Figure 6:
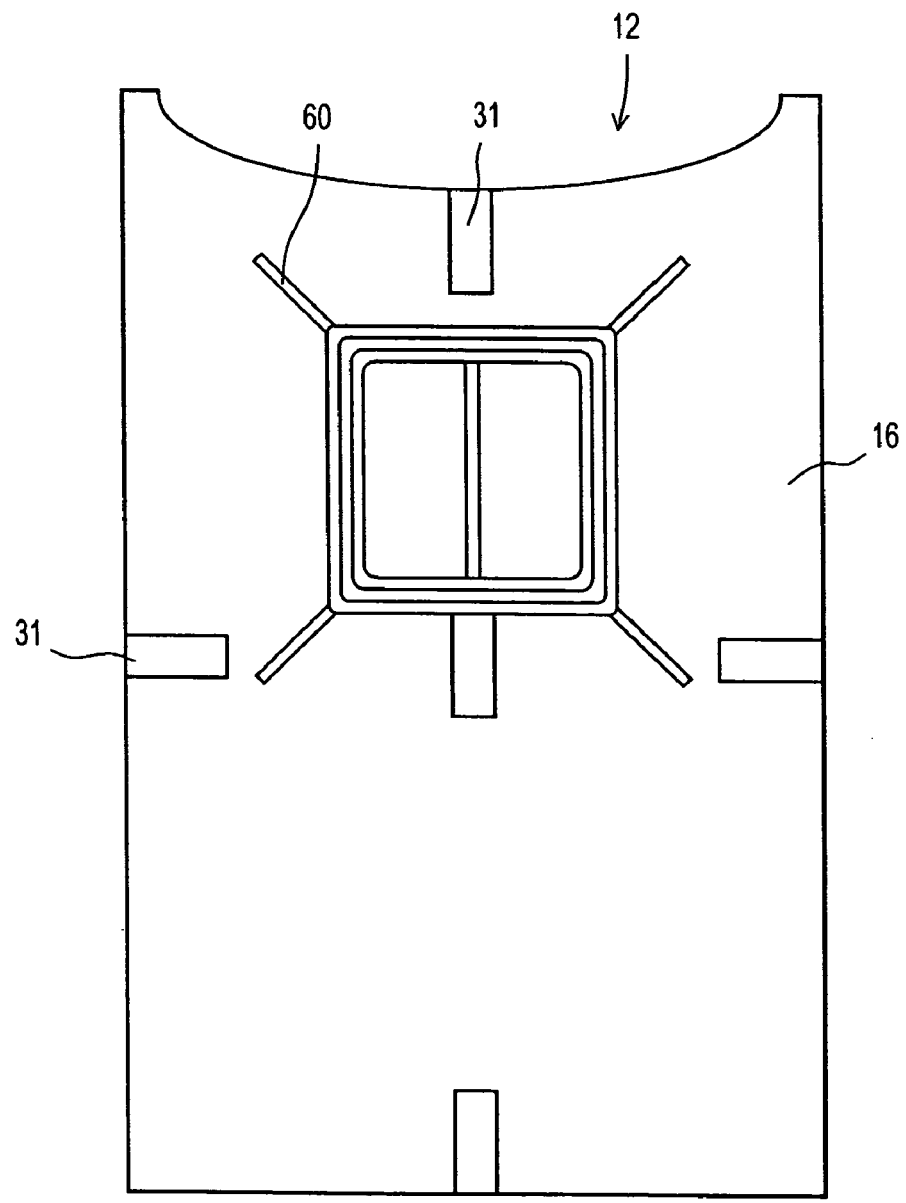
FIG. 6 is top view of the base plate showing the stabilizer tabs.
Figure 7:
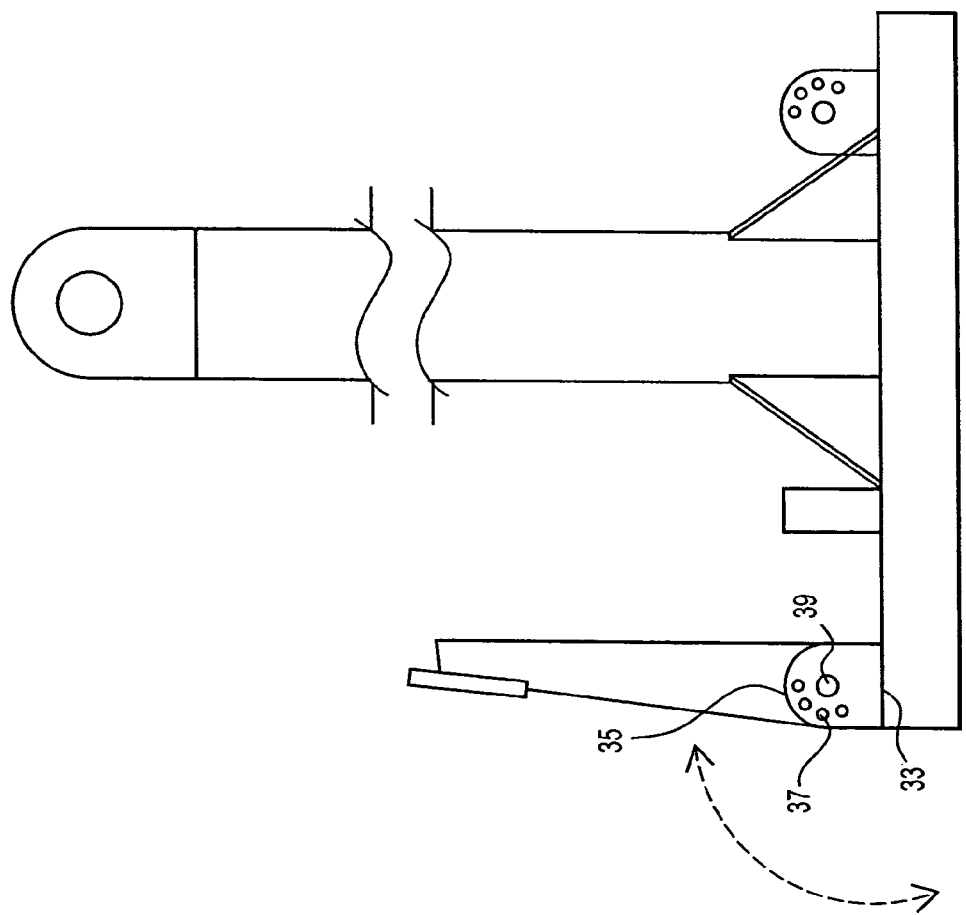
FIG. 7 is a side view of the base plate showing the stabilizer tabs and the stabilizer arm in position.
Figure 8:
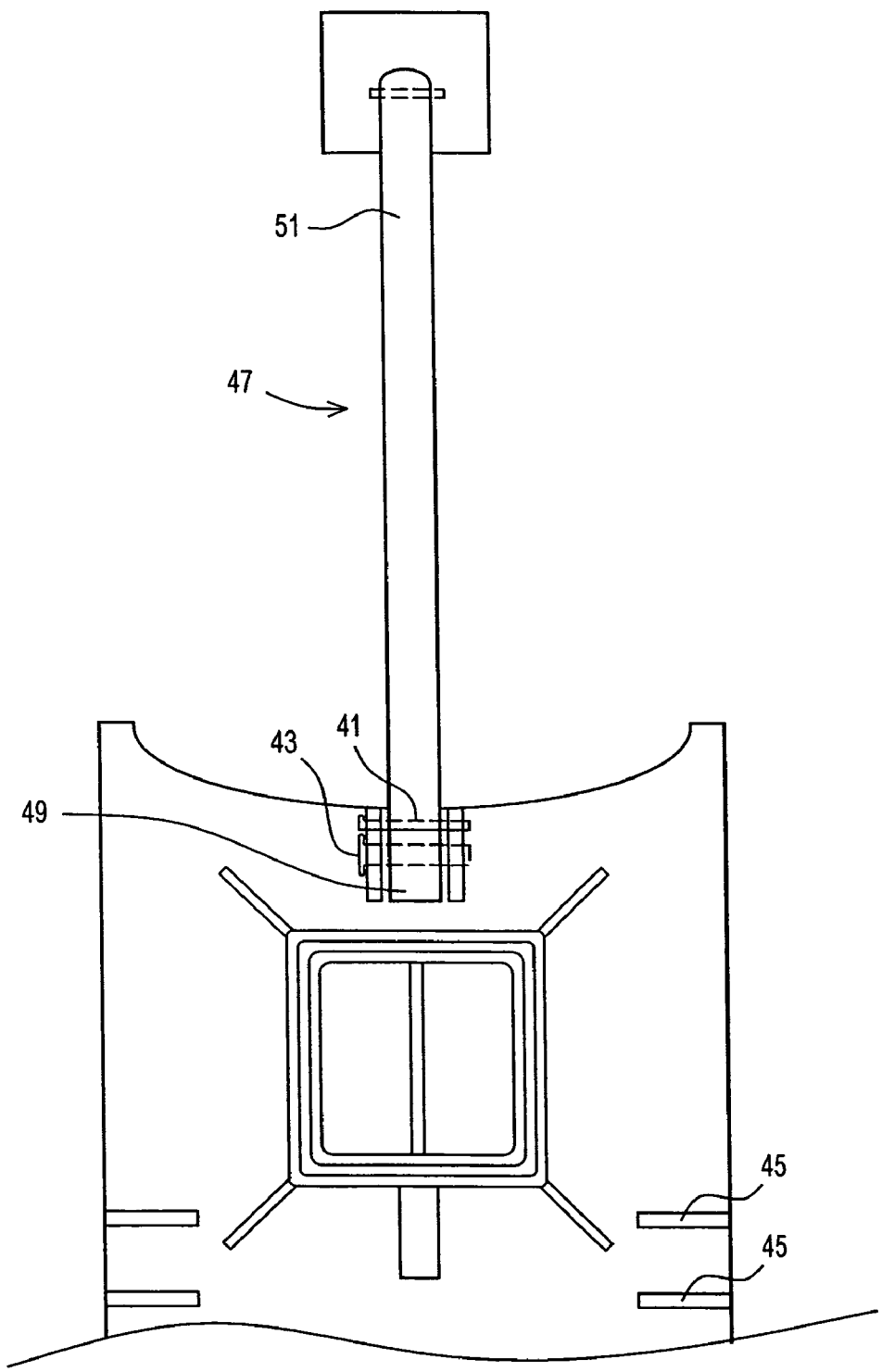
FIG. 8 is a top view of the pole puller showing the stabilizer arm in the downward, deployed position. Note that in this configuration there are two tabs for each stabilizer arm, locking the stabilizer arm between the tabs. The pivot pin and locking pin are visible.
Figure 9:
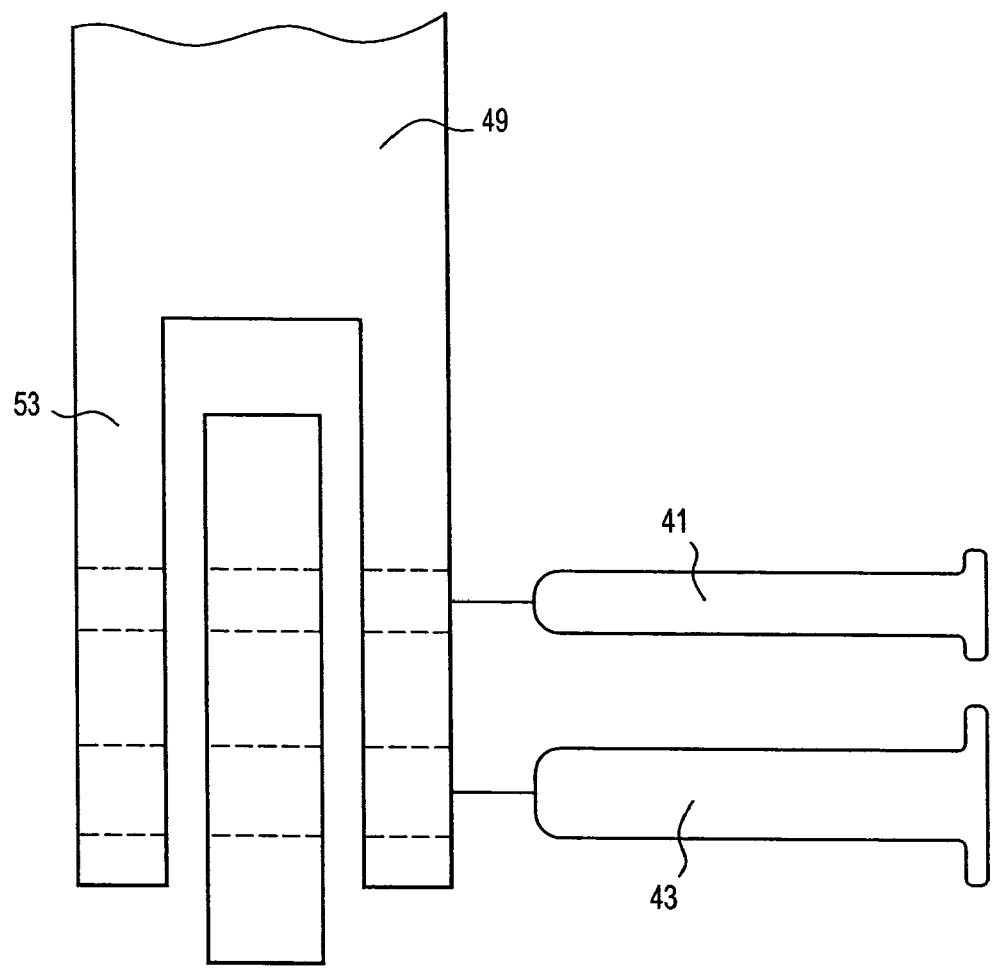
FIG. 9 is a top view of the end of the stabilizer arm, showing the C shaped configuration so as to reside on both sides of the stabilizer mounting tab.

Once the pole puller is tightened on the pole, the cable is disconnected from the lifting aperture of the slide tube upper end, and the cable is then placed around the pole 150. The boom is then moved and positioned, if necessary, to provide a lifting force to the pole once it has been pulled free from the ground, as shown in FIG. 2.

While many operators use the boom to pull a pole, it may exceed the limitations of the boom, causing damage to the boom and the boom truck. In this application, the boom is an adjunct, only lifting enough to cause the cable to be tight, and have some control on the pole, should it be quickly pulled free from the ground. In essence, the boom should lift no more than the weight of the pole that is free from the ground, and not be used to effectively pull the pole from the ground.

In this matter the pole is never out of "control", in that its position is controlled by the operator at all times. The pole is pulled up until the full travel of the ram is reached. The ram is then drawn back into the cylinder. The pole does not slide back down into the hole because the boom cable is likewise tightened to accommodate the upward movement of the pole. Using this technique of working the boom cable in conjunction with the pole puller by taking up boom cable slack, the pole remains in the position of maximum lift. As the ram is retracted, the chain loosens, and the chain is allowed to slide down on the pole to a second lift position. When the ram is at the most retracted position, the chain will have slid down to the lowest position on the pole.

At this point, the ram is then again extended, pulling the chain, once again, tight on the pole, which, in turn, then lifts the pole another amount. The boom cable is tightened as the pole is pulled upward. After two or three cycles the pole is free from the ground.

The slide tube has a length of about four or five feet, giving about a three foot pull. The five foot length allows for more easier movement and handling, and one skilled in the art would recognize that a large, or longer slide tube may be used to provide a longer lift extent.

Once the pole is pulled free, the boom cable is tightened and the pole kept in the lifted position. At this point the ram may be retracted, the chain loosened, and dropped away from the pole, allowing the pole to be moved free of the puller, and placed at a convenient location, either in a pile or on a trailer, by the boom operator.

The pole cradle has two functions. First it causes the puller to be aligned with the pole by forming a point of contact with the pole. The curved, or, in some cases, the V-shaped cradle, conforms to the pole and causes the pole to be located, and retained, relative to the puller in a more consistent manner, than would be achieved by, for instance, a flat pole cradle. The pole cannot rotate out of, or off of, the cradle because of the curved or V configuration.

The rectangular, or square, tubing that the slide tube and slide are made of also functions to prevent twisting of the cradle from the location it addresses the pole from. When lifting, the square hollow stock prevents the slide tube and slide from rotating relative to each other. This square sliding configuration keeps the pole being pulled along the long axis of the pole, because the base is also in contact with the pole, via the curved addressing surface. The consistency of pulling along the long axis of the pole also keeps the hydraulic ram pulling along or parallel to, the axis of the pole and the hydraulic cylinder, thereby providing maximum lifting or pulling power from the hydraulic cylinder to the pole.

In alternate embodiments the slide and slide tube may be rectangular, or even triangular. Either of these configurations would prevent the rotation of the slide relative to the slide tube.

Because there are four bearing surfaces of the squared, or rectangular slide tube and slide, it is important to have a source of lubrication, being the grease fittings, along the sides of the slide. This allows the user to pump grease into the space between the slide tube and the slide, allowing for a more smooth movement between the two surfaces.

In another embodiment the cradle has two chain holes on either end of the cradle. This allows a safety chain to be placed so as to capture and hold the pole within the cradle. While not usually necessary, this safety feature is included to minimize the risk of a pole twisting away from the puller, and swinging free from the boom cable. Operators can judge if the pole is under tension by the configuration of the chains. If the chains are loose, there is no tension. If the pole chains are tight, the operator will have to reposition the pole with the boom cable, or move the pole in some manner, to cause the chains to loosen, before he, or she, loosens the chains all together, thus allowing the pole to be moved free of the puller, thereby preventing any springing or sudden movement by the pole as it is suspended from the boom, after pulling.

The pole puller system is designed so that the slide tube is oriented generally parallel to the pole to be pulled. The pole to be pulled has a length and a long axis running with the length of the pole. The center of the pole would define the direction of the long axis of the pole. In use the slide moves in a direction parallel to the direction of the long axis of the pole to be pulled, providing a direct, upward lifting force along the center of the pole. This assures that the pole is being pulled through the pole hole in the ground, and not into the walls of the pole hole.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pole puller system comprising, in combination:
   a base plate having a generally rectangular configuration with a concavely shaped side, the base plate having a mounting portion comprising a tab for coupling a hydraulic cylinder thereto, with the tab having a mounting pin hole there through;
   a slide tube being operatively coupled to the base plate, the slide tube having an outer surface;
   a slide having a generally hollow cross-sectional tubular configuration, the slide having an inner surface, the slide being coupled to the slide tube with inner surface of the slide being slidably moved along the outer surface of the slide tube, the slide having a hydraulic cylinder mounting tab with a mounting aperture there through;
   a hydraulic cylinder having a ram, the hydraulic cylinder coupling the base plate tab and the slide tab;
   a hydraulic fluid pump;
   a pair of hydraulic hoses operatively coupling the hydraulic fluid pump and the hydraulic cylinder;
   a means for coupling the system to a pole to be pulled; and
   a boom truck having a boom, the boom being configured to lift the pole puller and position the pole puller near a pole to be pulled, the pole having a free weight, the boom being used lift the free weight of the pole.

2. The pole puller system as described in claim 1 with the pole puller further comprising the slide tube being oriented generally parallel to the pole to be pulled, the pole to be pulled having a length and a long axis running with the length of the pole, with the slide moving in a direction parallel to the direction of the long axis of the pole to be pulled.

3. The pole puller system as described in claim 2 with the pole puller further comprising:
   the base plate having a slide tube mounting portion and a ram mounting portion;
   the slide tube having a generally hollow rectangular cross-sectional tubular configuration having an outer surface and an inner surface and a tube wall thickness there between with a passageway therein;
   the slide having a generally hollow rectangular cross-sectional tubular configuration having an outer surface and an inner surface and a slide wall thickness there between with a passageway having a center point located therein;

the hydraulic cylinder having an outer case having an inner surface and an outer surface with a wall thickness there between and a cylinder recess contained therein, the hydraulic cylinder further comprising a ram being located within the recess of the cylinder with the ram having at least one hydraulic seal coupling the ram and the inner surface of the outer case, the hydraulic cylinder having an end cap with a ram aperture there through;

the hydraulic cylinder fluid pump having an associated hydraulic fluid reservoir, the hydraulic pump having at least one actuating valve, for directing hydraulic fluid from the hydraulic pump;

the pair of hydraulic cylinder hoses the hoses operatively and fluidly coupling the hydraulic pump and the first and second hydraulic hose connections of the hydraulic cylinder to the hydraulic fluid pump, the hoses being configured with an internal passageway to allow the passage of hydraulic fluid from the hydraulic pump to the hydraulic cylinder.

4. The pole puller system as described in claim 3 with the pole puller further comprising:

the slide tube having a lower end with a lower end portion, and an upper end with an upper end portion, with a length there between, the slide tube having an overall length from the upper end of the tube to the lower end of the tube of a first length;

the slide having a lower end and end portion, and an upper end and end portion, with an intermediate portion having a length there between, the slide having a pole cradle with a length and opposing ends coupled thereto; and the hydraulic cylinder end cap being coupled to the cylinder casing, the end cap having an associated hydraulic fluid seal contained therein.

5. The pole puller system as described in claim 4 with the pole puller further comprising:

the base plate being fabricated of a rigid material having a generally rectilinear configuration having a lower, ground contact surface and an upper lift contact surface with a thickness there between, the base plate having an edge placed between the upper surface and lower surface, the upper surface of the base, the base plate having a concave shaped edge to accommodate position next to the pole to be pulled;

the slide tube having a first external diameter across the cross-sectional tubular passageway with a center point running the length of the slide tube passageway;

the slide having an axis running with the passageway center point from the upper end of the slide to lower end of the slide, the axis being generally parallel with the passageway through the slide, the slide having an overall length from the upper end of the slide to the lower end of the slide of a second length, the intermediate portion of the slide having the pole cradle coupled thereto, the slide hydraulic ram mounting portion being coupled to the upper portion of the slide, the slide having a plurality of grease fittings there through;

the hydraulic cylinder outer case being coupled to the base plate at the location of the base plate mounting tab with the hydraulic ram being coupled to the slide tab so as to effectuate movement of the slide relative to the base as the ram moves within the hydraulic cylinder case; and a pole coupling chain coupled to the chain mounting portion of the slide, the chain being used to couple the pole puller to the pole to be pulled.

6. The pole puller system as described in claim 5 with the pole puller further comprising:

the lower end of the slide tube having a plurality of mounting fins coupled thereto, the mounting fins coupling the slide tube with the base plate by a securing means, the slide tube being oriented generally perpendicular to the upper surface of the base plate, the slide tube having a central axis located along the center point of the passageway through the slide tube;

the slide having a reinforcement brace coupling the pole cradle and the slide, the reinforcement brace being coupled to the slide by a securing means, the slide and slide tube being oriented with the center lines of the slide and the slide tube being generally in line with each other, the second length of the slide being less than the first length of the slide tube, the pole cradle further comprising a chain mounting hole located in the pole cradle brace.

7. The pole puller system as described in claim 6 with the pole puller further comprising:

the slide passageway having a second internal diameter within the cross-sectional tubular passageway with the passageway having a center point, the second internal diameter of the slide being greater than the first external diameter of the slide tube so as to allow the inner surface of the slide to be moved along the outer surface of the slide tube;

the upper end of the slide tube having a lifting tab coupled thereto, the lifting tab having a lifting aperture there through, the pole cradle having a generally rectilinear configuration with opposing ends of the pole cradle length being orientated in a generally perpendicular position relative to the slide axis, the pole cradle having a generally C-shaped configuration with parallel side tabs comprising the chain mounting portions of the pole cradle, with each of the side tabs having a rounded and slotted chair mounting aperture there through.

8. A pole pulling system comprising, in combination:

a rigid base plate having a generally rectangular configuration having a flat planar lower surface and an upper surface, the base plate having a concave shaped portion of the edge to accommodate placement next to the pole to be pulled;

a slide tube having a generally rectangular tubular configuration having an exterior cross sectional diameter of a first diameter and an outer surface, the slide tube being operatively coupled to the base plate;

a slide having a passageway there through, the slide having an inner surface, the passageway having a second interior cross sectional diameter, the second diameter being greater than the first diameter, the slide being slidably coupled to the slide tube with inner surface of the slide being slidably moved along the outer surface of the slide tube, the slide having a hydraulic cylinder mounting tab with a mounting aperture there through;

a hydraulic cylinder having a movable ram coupling the base plate and the slide;

a hydraulic fluid pump having a hydraulic fluid reservoir and a fluid control valve;

at least one hydraulic hose operatively coupling the hydraulic fluid pump and the hydraulic cylinder;

a boom truck having a boom and attachment means for positioning the system relative to a pole to be pulled, the boom truck providing a lifting force to lift the free weight of the pole to be pulled;

a means for coupling the system to a pole to be pulled to the slide.

9. The pole pulling system as described in claim 8 wherein the system further comprises:
- the base plate upper surface has an upwardly directed hydraulic cylinder mounting tab, the tab having a pin aperture there through;
- the slide tube being fixedly coupled to the base plate, the slide tube having an upper end with an associated lifting aperture located therein;
- the slide having a downwardly disposed hydraulic ram mounting tab coupled thereto;
- the hydraulic cylinder ram being coupled to the mounting tab of the slide with the hydraulic cylinder also being coupled to the mounting tab of the base plate, thereby effectuating movement of the slide as the ram moves within the hydraulic cylinder;
- the attachment means for positioning the system relative to a pole to be pulled is a cable; and
- the means for coupling the system to a pole to be pulled is a chain.

10. The pole pulling system as described in claim 8 wherein the system further comprises the slide having a pole cradle coupled thereto, the cradle having a generally C-shaped configuration, the cradle also having an associated attachment brace, with the brace having a chain aperture there through for the utilization of a chain to couple the system to a pole to be pulled.

11. The pole pulling system as described in claim 8 wherein the system further comprises the slide having a pole cradle coupled thereto, the cradle having a generally V-shaped configuration with two opposing ends, the cradle also having an associated attachment brace, with the brace having a chain aperture there through for the utilization of a chain to couple the system to a pole to be pulled, with each end of the cradle having a keyhole shaped chain aperture for coupling a safety chain thereto.

12. The pole pulling system as described in claim 8 wherein the system further comprises the base plate having a concave shaped portion of the edge to accommodate placement next to the pole to be pulled.

13. The pole pulling system as described in claim 8 wherein the system further comprises the pole to be pulled having a long axis with the slide tube being located generally parallel with the long axis of the pole, and the slide moving in a direction generally parallel with the long axis of the pole to be pulled.

14. The pole pulling system as described in claim 8 wherein the system further comprises the base having a plurality of stabilizer mounting tabs and a plurality of stabilizer arms, with the stabilizer arms each having a pivot pin hole and an associated pivot pin, and at least one locking pin hole with an associated locking pin.

* * * * *